United States Patent [19]

Leeming et al.

[11] 3,912,725

[45] Oct. 14, 1975

[54] PROCESS FOR CONVERTING A TYPE PROSTAGLANDINS TO E TYPE PROSTAGLANDINS

[75] Inventors: Michael R. G. Leeming, Canterbury, England; Donald P. Strike, St. Davids; Wen-Ling Kao, Devon, both of Pa.

[73] Assignee: American Home Products Corporation, New York, N.Y.

[22] Filed: June 5, 1974

[21] Appl. No.: 476,757

Related U.S. Application Data

[62] Division of Ser. No. 284,789, Aug. 30, 1972, Pat. No. 3,839,430.

[52] U.S. Cl. ........ 260/240 R; 260/345.7; 260/345.8; 260/468 D; 260/514 D; 260/999
[51] Int. Cl.$^2$ ............ C07D 309/06; C07D 309/22; C07C 69/02
[58] Field of Search........ 260/240 R, 468 D, 514 D, 260/345.7, 345.8

[56] References Cited
UNITED STATES PATENTS
3,755,426   8/1973   Strike et al. .................... 260/468 D OTHER PUBLICATIONS
Martel et al., Tet. Letters, 1972, No. 15, p. 1491–1496.

*Primary Examiner*—Arthur P. Demers
*Attorney, Agent, or Firm*—Robert Wiser

[57] ABSTRACT

A process for the conversion of A type prostaglandins to E type prostaglandins is disclosed. Heretofore unknown prostaglandin derivatives are utilized as intermediates in the process.

3 Claims, No Drawings

PROCESS FOR CONVERTING A TYPE PROSTAGLANDINS TO E TYPE PROSTAGLANDINS

CROSS-REFERENCE TO RELATED APPLICATION

This application is a divisional of U.S. pat. application Ser. No. 284,789, filed Aug. 30, 1972, now U.S. Pat. No. 3,839,430.

BACKGROUND OF THE INVENTION

The prostaglandins are a group of chemical compounds, whose members possess a broad spectrum of pharmacologic activities. The E type prostaglandins, which contain the substituted cyclopentano moiety

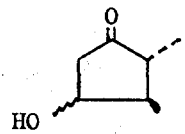

are particularly important as they have been generally shown to be the most pharmacologically active class of prostaglandins. E type prostaglandins have been obtained mainly by extraction of mammalian tissue, in which they occur in very small amounts. The source, method of collection, and their inherent instability combine to make collection of E type prostaglandins from natural sources, a tedious and inefficient means of obtaining these valuable and important compounds.

Recently, total and partial syntheses of E type prostaglandins have been reported. A partial synthesis beginning with the A type prostaglandins, i.e. those possessing the substituted cyclopentano moiety

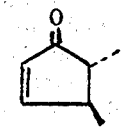

[G. L. Bundy, W. P. Schneider, F. H. Lincoln, and J. E. Pike, J. Am. Chem. Soc., 94, 2123 (1972)] has become particularly important since the discovery [A. J. Weinheimer, and R. L. Spraggins, Tetrahedron Letters, 59 (1969)] that 15 epimeric A type prostaglandins may be collected in substantial quantities from the coral *Plexaura homomalla* (Esper), a non-mammalian source. The epimerization which is required to convert the 15-epimeric A type prostaglandins obtained from *Plexaura homomalla* (Esper), to the configuration of the prostaglandins found in mammalian tissue is described in the copending U.S. application of Donald P. Strike and Herchel Smith, Ser. No. 223,722, filed Feb. 4, 1972, now abandoned.

It is the primary object of the present invention, to provide processes whereby A type prostaglandins may conveniently be converted to E type prostaglandins.

It is the secondary object of the present invention to provide, heretofor unknown, valuable, intermediates for the synthesis of E type prostaglandins.

SUMMARY OF THE INVENTION

The invention sought to be patented in a principal process aspect resides in the concept of a process for preparing a compound of the formula

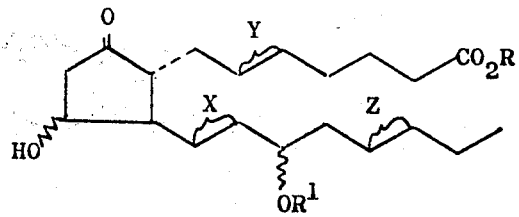

in which R is hydrogen or alkyl of from 1 to about 6 carbon atoms, $R^1$ is hydrogen, 2-tetrahydropyranyl, or carboxylic acyl of from 1 to about 6 carbon atoms, and
i. X, Y and Z are single bonds;
ii. X is a trans-double bond, Y and Z are single bonds;
iii. X is a trans-double bond, Y is a cis-double bond, Z is a single bond; or
iv. X is a trans-double bond, Y and Z are cis-double bonds;

comprising:
a. treating a compound of the formula

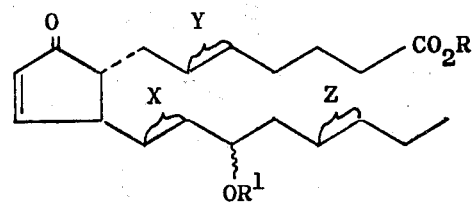

in which R, $R^1$, X, Y, and Z are as defined above with an epoxidizing agent to form a compound of the formula,

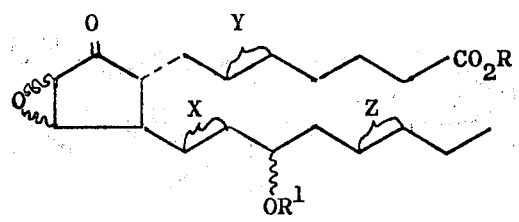

b. treating the thus formed epoxide with hydrogen bromide to form a compound of the formula

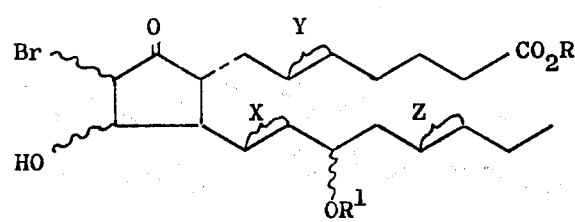

and
c. treating the thus formed bromohydrin with tri-n-butyltin hydride.

The invention sought to be patented in a second process aspect resides in the concept of a process for preparing a compound of the formula

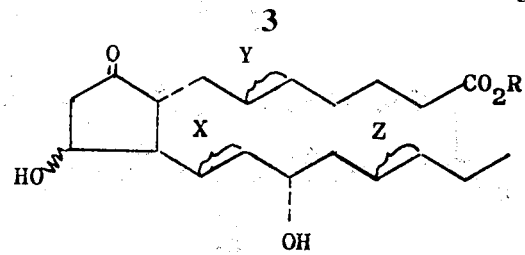

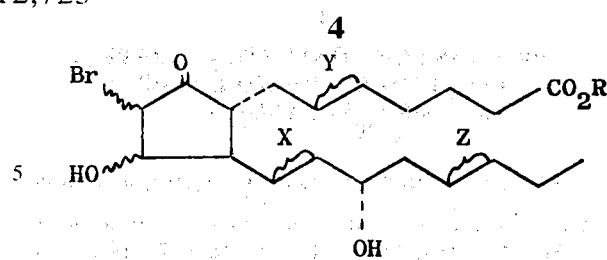

in which R is hydrogen or alkyl of from 1 to about 6 carbon atoms, and
i. X, Y and Z are single bonds;
ii. X is a trans-double bond, Y and Z are single bonds;
iii. X is a trans-double bond, Y is a cis-double bond, Z is a single bond; or
iv. X is a trans-double bond, Y and Z are cis-double bonds;
comprising:
a. treating a compound of the formula

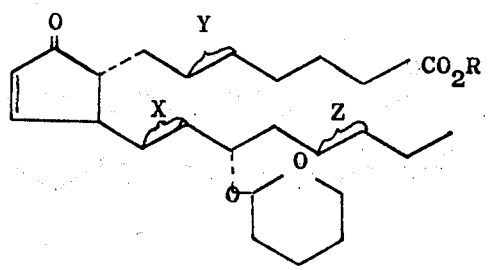

in which R, X, Y, and Z are as defined above with an epoxidizing agent to form a compound of the formula

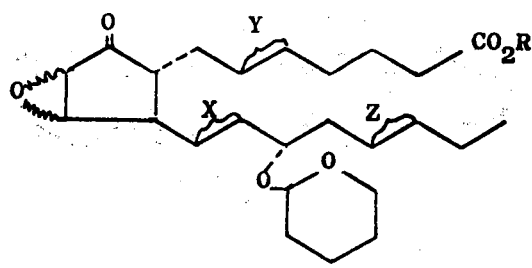

b. treating the thus formed epoxide with hydrogenbromide to form a compound of the formula

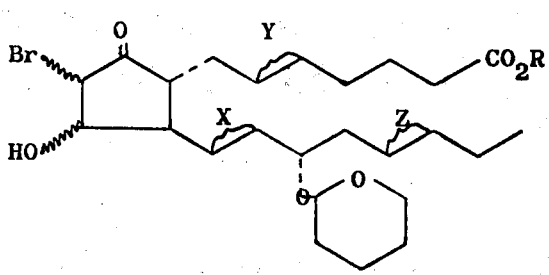

c. treating the thus formed bromohydrin with dilute acid to form a compound of the formula and
d. treating the thus formed bromohydrin with tri-n-butyltin hydride.

The invention sought to be patented in a principal composition aspect resides in the concept of a compound of the formula

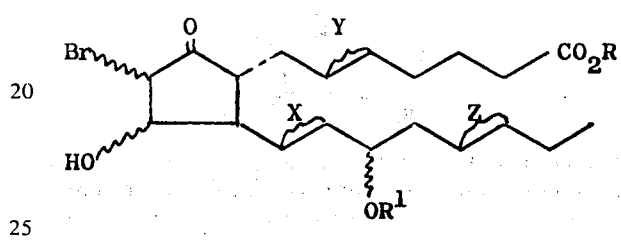

in which R is hydrogen or alkyl of from 1 to about 6 carbon atoms, $R^1$ is hydrogen, 2-tetrahydropyranyl, or carboxylic acyl of from 1 to about 6 carbon atoms, and
i. X, Y and Z are single bonds;
ii. X is a trans-double bond, Y and Z are single bonds;
iii. X is a trans-double bond, Y is a cis-double bond, Z is a single bond; or
iv. X is a trans-double bond, Y and Z are cis-double bonds.

The tangible embodiments of the principal composition aspect of the invention possess the inherent physical properties of being generally colorless to light yellow colored oils, are substantially insoluble in water, and are generally soluble in such organic solvents as benzene, ethyl acetate, ethyl ether, and methanol. Examination of the compounds produced according to the hereinafter described process reveals, upon infrared, ultraviolet mass, and other nuclear magnetic resonance spectrographic analysis, spectral data supporting the molecular structure hereinbefore set forth. For example, the bromine function is evident in the mass spectrum while the epoxide function is evident from the nuclear magnetic resonance spectrum. The aforementioned physical characteristics taken together with the nature of the starting materials confirm the molecular structure as hereinbefore set forth.

The tangible embodiments of the principal composition aspect of the invention possess the applied use characteristic of being intermediates for making compositions which possess the inherent applied use characteristic of exerting qualitatively varying effects in animals as evidenced by pharmacological evaluation according to standard test procedures, particularly, as bronchodilators, hypotensive agents, agents for reduction of gastric secretion, and agents for inhibition of blood cell adhesiveness.

The invention sought to be patented in a second composition aspect resides in the concept of the compound of formula

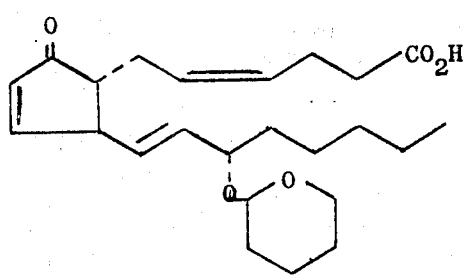

The tangible embodiment of the second composition aspect of the invention possesses the inherent physical properties of being a colorless oil, is substantially insoluble in water, and soluble in such organic solvents as benzene, ethyl acetate, ethyl ether, and methanol. Examination of the compound reveals, upon infrared, ultraviolet, mass, and nuclear magnetic resonance spectrographic analysis, spectral data supporting the molecular structure hereinbefore set forth.

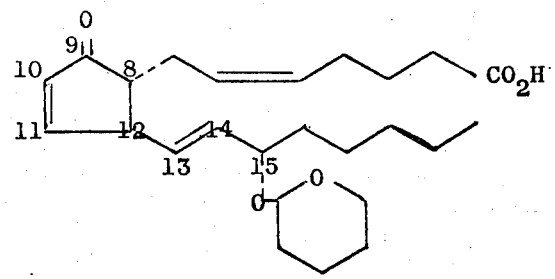

I

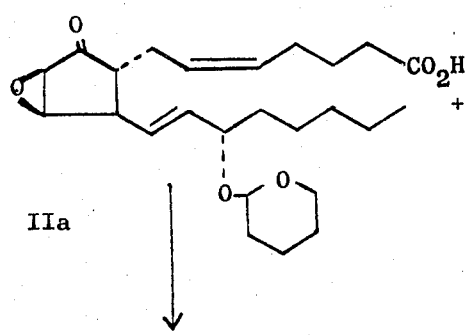

IIa

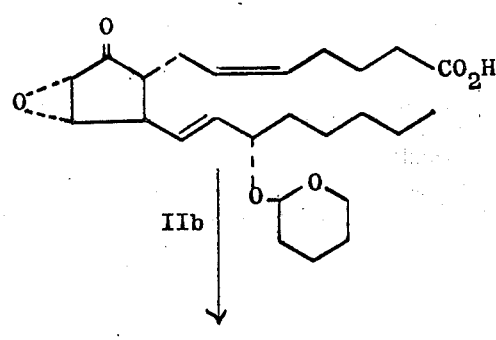

IIb

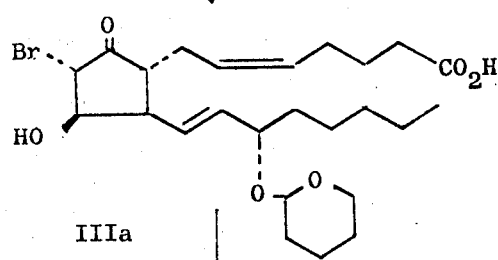

IIIa

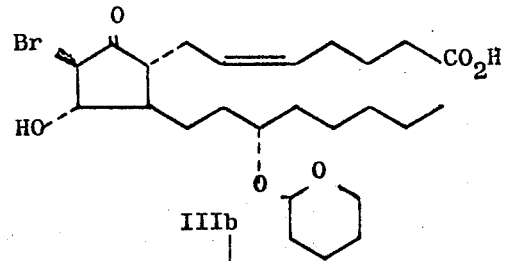

IIIb

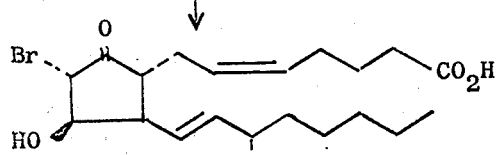

IVa

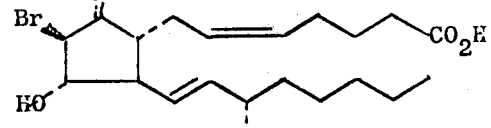

IVb

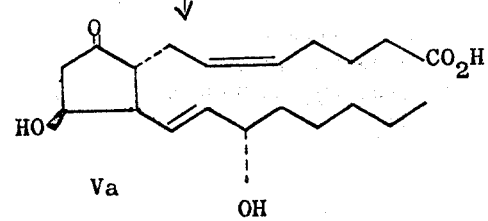

Va

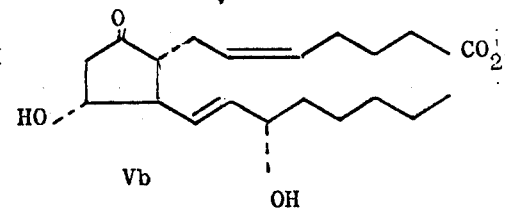

Vb

DESCRIPTION OF THE INVENTION

In describing the invention herein, reference will be made to FIG. 1, which illustrates, schematically, the reaction sequence for converting a specific A type prostaglandin to an E type prostaglandin. Those skilled in the art will recognize that in the structures the dotted lines (---) and the heavy lines ( ) are meant to indicate, respectively, bonds directed below and above the plane of the page.

The A type prostaglandin molecule I which may be prepared by treating prostaglandin $A_2$ with dihydropyran and an acid catalyst (e.g. p-toluenesulfonic acid) is treated with an epoxidizing agent to form a mixture of the epoxides IIa and IIb. Any of the hydroperoxide epoxidizing agents known in the art may be utilized for this purpose, e.g. hydrogen peroxide, n-butylhydroperoxide and the like; those preferred are basic hydrogen peroxide in alkanol solution, and basic n-butylhydroperoxide. The epoxidation may be carried out under a variety of reaction conditions and in a variety of solvents. The preferred solvents are aqueous alkanol mixtures (i.e. methanol-water; ethanol-water) while the preferred temperature range is from about −40° to about +10° for times of from about 15 minutes to about 5 hours. Those skilled in the art of organic chemistry will recognize that a mixture of two isomeric epoxides IIa and IIb are formed as a result of this reaction. The epoxide mixture is next treated with hydrobromic acid to produce the mixture of bromohydrins IIIa and IIIb. The hydrogen bromide addition to the epoxide molecules proceeds particularly efficiently when one utilizes a mixture of acetic acid and diethyl ether as solvents at temperatures of from about −10° to +10° for periods of time varying from about 10 minutes to about 1 hour. If desired, variation of the solvents and reaction conditions will suggest themselves to those skilled in the art of organic chemistry, these parameters not being critical. The mixture of bromohydrin molecules IIIa and IIIb is next treated with dilute acid, for example 1 N hydrochloric acid, to remove the 2-tetrahydropyranyl group, thus producing bromohydrin compounds IVa and IVb. It will be obvious to those skilled in the art that if the 2-tetrahydropyranyl group is replaced with a carboxylic acyl group, for example, ethanoyl or butanoyl, that such a group may be removed by either dilute acid or dilute base hydrolysis (preferably dilute basic hydrolysis). The compounds IVa and IVb are next treated with tri-n-butyltin hydride and azobisisobutyronitrile preferably in benzene at 70°, to remove the bromine atom, and the mixture of prostaglandin $E_2$ molecules Va and Vb so produced may be isolated and purified by various of the means known in the art such as chromatography. If desired, the 2-tetrahydropyranyl group need not be removed, prior to the removal of the bromine atom.

It is well-known in the art of organic chemistry, that two isomeric epoxides may be produced on epoxidation of an unsymmetrically substituted double bond. The ratio of the two resultant isomeric epoxides need not of necessity be equal to unity, and indeed, it is well documented in the organic chemical literature that, for example, steric anc electronic factors inherent in the molecule or the reaction conditions, may cause one of the isomers to predominate. Thus, treatment of the epoxide mixture IIa and IIb, when produced by epoxidation of the A type prostaglandin I with n-butylhydroperoxide in basic methanol solution, with hydrobormic acid produces the bromohydrin molecules IIIa and IIIb in a ratio of 1:4. One skilled in the art of organic chemistry will recognize that epoxide IIb will yield bromohydrin IIIb and IIa will likewise yield IIIa when treated with hydrobromic acid, thus the ratio of bromohydrins produced can be corrolated with the ratio of the epoxide isomers in the mixture. This observation has proven fortuitous, since the bromohydrin IIIb ultimately yields the prostaglandin $E_2$ (Vb), thus providing an efficient and practical means for converting prostaglandin $A_2$ into the valuable prostaglandin $E_2$.

The preparation of increased amounts of the 11-epimeric isomer has also been accomplished. Thus epoxidation of prostaglandin $A_2$ with basic hydrogen peroxide in methanolic solution followed by treatment of the epoxide mixture with hydrobromic acid has been shown to produce the bromohydrins IVa and IVb in 1:1 ratio. While epoxidation of prostaglandin $A_2$ with basic n-butylhydroperoxide followed by treatment of the epoxide mixture with hydrobromic acid produces the bromohydrins IVa and IVb in a ratio of 2:3.

Again referring to FIG. 1, it will be obvious to those skilled in the art, that the epoxide mixture may be separated for example by chromatography prior to treatment with hydrobromic acid, thus permitting the preparation of the isomerically pure bromohydrin molecules IIIa and IIIb. Alternately, the bromohydrin mixture IIIa and IIIb may be prepared from the mixture of epoxides and then separated, for example by chromatography. Further, the mixture of bromohydrin molecules IIIa and IIIb may first be hydrolyzed to remove the 2-tetrahydropyranyl group producing bromohydrins IVa and IVb which mixture may be separated, for example, by chromatography prior to the removal of the bromine atom or, the bromine atom may be removed without separating IVa from IVb, and the resulting mixture of prostaglandin $E_2$ molecules may be separated for example by chromatography.

In the preferred reaction sequence, the A type prostaglandin I is epoxidized with n-butylhydroperoxide the isomer mixture IIa and IIb is treated with hydrobromic acid, yielding the mixture of bromohydrin molecules IIIa and IIIb which mixture is hydrolyzed with dilute hydrochloric acid solution to remove the 2-tetrahydropyranyl group producing the isomer mixture IVa and IVb which mixture is separated chromatographically yielding a ratio of IVa to IVb of 1:4. The pure isomers IVa and IVb are then treated separately with tri-n-butyltin hydride to produce the isomerically pure $E_2$ prostaglandins Va and Vb.

While the process of the invention has been described with reference to a specific embodiment thereof, it will be apparent to those skilled in the art that it will work equally well for all embodiments within the scope of the invention.

In the following examples, the upper case letters S and R used in naming the compounds produced refer respectively to the natural and epimeric stereo form about the 3 position of the 8 carbon chain (U.S. von Euler, and R. Eliasson, "Prostaglandins" page 16, 1967 Academic Press, N. Y.). Thus the structure in FIG. 1 all display the natural or S configuration about this center.

EXAMPLE 1

7-[2-(3-S-[Tetrahydropyran-2-Yloxy]-1-Octenyl)-5-Oxo-3-Cyclopenten-1-yl]-5-Heptenoic Acid (I)

A solution of 10.0 g. of $PGA_2$, 4.0 g. of dihydropyran and 0.06 g. of p-toluenesulfonic acid in 300 ml. of benzene was stirred at 25° for 1 hour. The reaction mixture was diluted with ether, washed with water and dried over sodium sulfate. Evaporation and silica chromatography of the residue with 30% ethyl acetate in hexane gave 4.4 g. of 7-[2-(3-S-[tetrahydropyran-2-yloxy]-1-octenyl)-5-oxo-3-cyclopenten-1-yl]-5-heptenoic acid as an oil, $\lambda_{max}^{film}$ 3.45, 5.85, 6.3, 9.8, 10.3 $\mu$, $\lambda_{max}^{95\% EtOH}$ 218 m$\mu$ ($\epsilon$ 9,600).

EXAMPLE 2

7-[4$\alpha$-Bromo-3$\beta$-Hydroxy-2-(3-S-Hydroxy-1-Octenyl)-5-Oxocyclopentyl]-5-Heptenoic Acid (IVa)

and

7-[4$\beta$-Bromo-3$\alpha$-Hydroxy-2-(3-S-Hydroxy-1-Octenyl)-5-Oxocyclopentyl]-5-Heptenoic Acid (IVb)

A solution of 1.14 g. of 7-(2-[3-S-(tetrahydropyran-2-yloxy)-1-octenyl]-5-oxo-3-cyclopenten-1-yl)-5-heptenoic acid in 17 ml. of methanol and 1.1 ml. of water was mixed at −25° to −30°C. with 4.98 g. of n-butylhydroperoxide. To this mixture, 3.15 ml. of 1N sodium hydroxide was added to adjust the pH to 8–9. After 4 hours, the reaction mixture was diluted with 20 ml. of water, acidified with acetic acid and extracted with ether. After washing with brine, drying with magnesium sulfate the extract was evaporated to give 1.10 g. of crude oily 7-[2-(3-S-[tetrahydropyran-2-yloxy]-1-octenyl]-4-oxo-6-oxabicyclo[3.1.0]hex-3-yl]-5-heptenoic acid.

A solution of the above crude product in 35 ml. of ether was treated at 0°C. with 0.84 g. of 30% hydrogen bromideacetic acid in 8 ml. of ether and stirred for 10 minutes. The reaction mixture was diluted with 300 ml. of ether, washed, dried and evaporated to give 1.38 g. of crude oily 7-(4-bromo-3-hydroxy-2-[3-S-(tetrahydropyran-2-yloxy)-1-octenyl]-5-oxocyclopentyl)-5-heptenoic acid.

A solution of the above oily product in 70 ml. of tetrahydrofuran was treated at 10°C. with 70 ml. of 1N hydrochloric acid and stirred for 45 minutes. The reaction mixture was diluted with 500 ml. of ether, washed, dried, evaporated and the residue chromatographed on silica. Elution with 40% ethyl acetate-hexane gave 0.10 g. of 7-[4$\alpha$-bromo-3$\beta$-hydroxy-2-(3-S-hydroxy-1-octenyl)-5-oxocyclopentyl]-5-heptenoic acid and further elution with 50% ethyl acetate hexane obtained 0.38 g. of 7-[4$\beta$-bromo-3$\alpha$-hydroxy-2-(3-S-hydroxy-1-octenyl)-5-oxocyclopentyl]-5-heptenoic acid.

Ratio of IVa/IVb = 1:4.

EXAMPLE 3

7-[3$\alpha$-Hydroxy-2-(3-S-Hydroxy-1-Octenyl)-5-Oxocyclopentyl]-5-Heptenoic Acid (Vb)

A solution of 1.27 g. of 7-[4$\beta$-bromo-3$\alpha$-hydroxy-2-(3-S-hydroxy-1-octenyl-5-oxocyclopentyl]-5-heptenoic acid and 2.04 ml. of tri-n-butyltin hydride in 200 ml. of benzene was stirred at 75°C. under nitrogen and treated dropwise with a solution of 1.08 g. of azobisisobutyronitrile in 50 ml. of benzene during 35 minutes. The mixture was stirred at 75°C. for 15 minutes, evaporated under vacuum and the residue dissolved in ether. The ether solution was extracted three times with 0.2M sodium phosphate buffer (pH 8.5) followed by five times with 5% sodium bicarbonate and the extracts acidified to pH with hydrochloric acid and extracted with ether. After washing and drying, the extract was evaporated and the residue chromatographed on silica. Elution with 70% ethyl acetate in hexane followed by crystallization from ethyl acetatepentane afforded 140 mg. of 7-[3$\alpha$-hydroxy-2-(3-S-hydroxy-1-octenyl)-5-oxocyclopentyl]-5-heptenoic acid, m.p. 67°–68°C., mixed m.p. with $PGE_2$ 66.5°–67.5°C., $\lambda_{max}^{KBr}$ 2.9, 3.0, 3.45, 5.75, 5.85, 7.6, 7.95, 8.35, 8.65, 9.35, 10.0, 10.35, 11.14, 13.35 $\mu$. NMR: $\delta$ 6.23 (3, S, OH), 5.70 (2, M, C-13 and 14 H), 5.45 (2, M, C-5 and 6 H), 4.0–4.4 (2, M, C-11 and 15 H) ppm. Optical rotation: $[\alpha]_D^{25}$ (−) 64.8° (c 1.0, THF [reported (−) 61° in J. Am. Chem. Soc. 92, 397 (1970)]. Mass spectrum: $M^+-H_2O$ at m/e 334 (theory 334).

EXAMPLE 4

7-[3$\beta$-Hydroxy-2-(3-S-Hydroxy-1-Octenyl)-5-Oxocyclopentyl]-5-Heptenoic Acid (Va)

A solution of 2.8 g. of a mixture of 7-[4$\alpha$ and 4$\beta$-bromo-3$\beta$ and 3$\alpha$-hydroxy-2-(3-S-hydroxy-1-octenyl)-5-oxocyclopentyl]-5-heptenoic acid and 4.48 ml. of tri-n-butyltin hydride in 400 ml. of benzene was stirred at 70°C. under nitrogen and treated with a solution of 2.4 g. of azobisisobutyronitrile in 100 ml. of benzene in portions over 80 minutes. The reaction mixture was concentrated under vacuum, diluted with ether and extracted 6 times with 5% sodium bicarbonate solution. After acidification with acetic acid, the aqueous solutions were extracted with ether and the extract washed, dried and evaporated. Silica chromatography of the residue with 60% ethyl acetate in hexane gave 0.23 g. of 7-[3$\beta$-hydroxy-2-(3-S-hydroxy-1-octenyl)-5-oxocyclopentyl]-5-heptenoic acid an oil, $\lambda_{max}^{film}$ 3.0, 3.5, 6.85, 7.2, 8.2, 8.65, 10.3 $\mu$. NMR: $\delta$ 6.18 (3, S, OH), 5.80 (2, M, C-13 and 14 H), 5.43 (2, M C-5 and 6 H), 4.45 (1, M, C-11 H), 4.18 (1, M, C-15 H) ppm. Mass spectrum: $M^+-H_2O$ at m/e 334 (theo 334). Further elution of the column with 70% ethyl acetate in hexane yields 7[3$\alpha$-hydroxy-2-(3-S-hydroxy-1-octenyl)-5-oxo-cyclopentyl]-5-heptenoic acid.

EXAMPLE 5

7-[2-(3-S-Hydroxy-1-Octenyl)-4-Oxo-6-Oxabicyclo[3.1.0]Hex-3-Yl]-5-Heptenoic Acid (Mixture of $PGA_2$ $\alpha$, and $\beta$ Epoxides)

An ice-cooled solution of 1.9 g. of 7-[2-(3-S-hydroxy-1-octenyl)-5-oxo-3-cyclopenten-1-yl]-5-heptenoic acid and 6.0 ml. of 30% hydrogen peroxide in 60 ml. of methanol and 6.0 ml. of water was treated with 6.6 ml. of 1 N sodium hydroxide. After stirring at 0° for ½ hour, the mixture was diluted with water, acidified with acetic acid and extracted with ether. After washing and drying, the extract was evaporated to obtain 2.0 g. of 7-[2-(3-S-hydroxy-1-octenyl)-4-oxo-6-oxabicyclo[3.1.0]hex-3-yl]-5-heptenoic acid as an oil, $\lambda_{max}^{film}$ 3.05, 3.45, 5.8, 7.2, 8.15, 10.3 $\mu$. NMR: $\delta$ 6.4 (OH), 5.8 (2, M, C-13 and 14 H), 5.33 (2, M C-5 and 6 H), 4.23 (1, M, C-15 H), 3.85 and 3.5 (1, M, epoxide H's) ppm. Mass spectrum (purified sample): $M^+-H_2O$ at m/e 332.2010 (theory 332.1986).

EXAMPLE 6

7-[4α-Bromo-3β-Hydroxy-2-(3-S-Hydroxy-1Octenyl)-5-Oxocyclopentyl]-5-Heptenoic Acid (IVa)

and

7-[4β-Bromo-3α-Hydroxy-2-(3-S-Hydroxy-1-Octenyl)-5-Oxocyclopentyl]-5-Heptenoic Acid (IVb)

A solution of 1.9 g. of 7-[2-(3-S-hydroxy-1-octenyl)-4-oxo-6-oxabicyclo[3.1.0]hex-3-yl]-5-heptenoic acid (as prepared in Example 5) in 50 ml. of ether was cooled in a methanol-ice bath and treated dropwise with a solution of 1.37 g. of 32% hydrobromic acid-acetic acid in 35 ml. of ether over ½ hour. After stirring at 0° for 20 minutes, the reaction mixture was diluted with ether, washed with water, dried and evaporated. Silica chromatography, of the resulting product mixture with 40% ethyl acetate in hexane gave 0.73 g. of 7-[4α-bromo-3β-hydroxy-2-(3-S-hydroxy-1-octenyl)-5-oxocyclopentyl]-5-heptenoic acid as an oil, $\lambda_{max}^{film}$ 3.0, 3.4, 5.7, 5.85, 7.1, 8.2, 9.5, 10.25 μ. NMR: δ 5.98 (3, OH), 5.73 (2, M, C-13 14 H), 5.4 (2, M, C- 5 and 6 H), 4.0–4.44 (3, M, C-10, 11 and 15 H) ppm. Mass spectrum: $M^+-2H_2O$ at m/e 394 (theory 394).

Further elution with 50% ethyl acetate in hexane afforded 0.67 g. of 7-[4β-bromo-3α-hydroxy-2-(3-S-hydroxy-1-octenyl)-5-oxocyclopentyl]-5-heptenoic acid as an oil, $\lambda_{max}^{film}$ 3.0, 4.4, 5.7, 5.85, 7.1, 8.7 10.3 μ. NMR: δ 6.1 (3, OH), 5.65 (2, M, C-13 and 14 H), 5.43 (2, M, C-5 and 6 H), 3.9–4.4 (3, M, C-10, 11 and 15 H) ppm. Mass spectrum: $M^+-2H_2O$ at m/e 394 (theory 394).

Ratio of IVa/IVb = 1:1.

EXAMPLE 7

7-[4α-Bromo-3β-Hydroxy-2-(3-S-Hydroxy-1-Octenyl)-5-Oxocyclopentyl]-5-Heptenoic Acid (IVa)

and

7-[4β-Bromo-3α-Hydroxy-2-(3-S-Hydroxy-1-Octenyl)-5-Oxocyclopentyl]-5-Heptenoic Acid (IV b)

A solution of 0.50 g. of 7-[2-(3-S-hydroxy-1-octenyl)-5-oxo-3-cyclopenten-1-yl]-5-heptenoic acid in 9 ml. of methanol and 0.5 ml. of water was mixed at −25° to −30°C. with 2.70 g. of n-butylhydroperoxide. To this mixture, 1.75 ml. of 1 N sodium hydroxide was added to adjust the pH to 8–9. After 4 hours, the reaction mixture was diluted with 10 ml. of water, acidified with acetic acid and extracted with ether. After washing with brine, drying over magnesium sulfate, the extract was evaporated to give 0.48 g. of crude oily 7-[2-(3-S-hydroxy-1-octenyl)-4-oxo-6-oxabicyclo[3.1.0]hex-3-yl]-5-heptenoic acid.

A solution of the above crude product in 20 ml. of ether was treated at 0°C. with 0.60 g. of 30% hydrogen-bromideacetic acid in 5 ml. of ether and stirred for 10 minutes. The reaction mixture was diluted with 200 ml. of ether, washed, dried evaporated and the residue chromatographed on silica. Elution with 40% ethyl acetate-hexane gave 0.19 g. of 7-[4α-bromo-3β-hydroxy-2-(3-S-hydroxy-1-octenyl)-5-oxocyclopentyl]-5-heptenoic acid and further elution with 50% ethyl acetate-hexane obtained 0.30 g. of 7-[4β-bromo-3α-hydroxy-2-(3-S-hydroxy-1-octenyl)-5-oxocyclopentyl]-5-heptenoic acid.

Ratio of IVa/IVb = 2:3.

EXAMPLE 8

7-[2-(3-R-Hydroxy-1-Octenyl)-4-Oxo-6-Oxabicyclo[3.1.0]Hex-3-Yl]-5-Heptenoic Acid (Mixture of 15-epi-PGA$_{PGA2}$ α, and β Epoxides)

A solution of 0.95 g. of 15-epi-PGA$_2$ and 2.5 ml. of 30% hydrogen peroxide in 25 ml. of methanol and 2.5 ml. of water was cooled to −5°C. in a methanol-ice bath and treated with 3.0 ml. of 1 N sodium hydroxide in portions over 2.5 hours. The reaction mixture was diluted with water, acidified with acetic acid and extracted with ether. After washing and drying, the extract was evaporated and the residue chromatographed on silica. Elution with 40% ethyl acetate in hexane afforded 0.38 g. of 7-[2-(3-R-hydroxy-1-octenyl)-4-oxo-6-oxabicyclo[3.1.0]hex-3-yl]-5-heptenoic acid as an oil, $\lambda_{max}^{film}$ 3.0 (shoulder), 3.45, 5.8, 7.1, 10.3, 11.9 μ. NMR: δ 6.68 (3, S, OH), 5.63 (2, M, C-13 and 14 H), 5.43 (2, M, C-5 and 6 H), 4.13 (1, M, C-15), 3.78 and 3.48 (1, d, J=2.3, epoxide H's) ppm. Mass spectrum: $M^+$ at m/e 350 (theory 350), $M^+-H_2O$ at m/e 332.1979 (theory 332.1986).

The subject matter which the applicants regard as their invention is particularly pointed out and distinctly claimed as follows:

1. A compound of the formula:

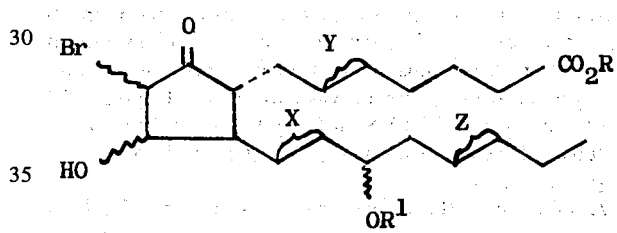

in which R is hydrogen or alkyl of from 1 to about 6 carbon atoms, $R^1$ is 2-tetrahydropyranyl, or carboxylic acyl of from 1 to 6 carbon atoms, and
 i. X, Y and Z are single bonds;
 ii. X is a trans-double bond, Y and Z are single bonds;
 iii. X is a trans-double bond; Y is a cis-double bond, Z is a single bond; or
 iv. X is a trans-double bond, Y and Z are cis-double bonds; with the proviso that the bromine and hydroxy ring substituents be in a trans stereochemical configuration.

2. The compound of claim 1 which is:

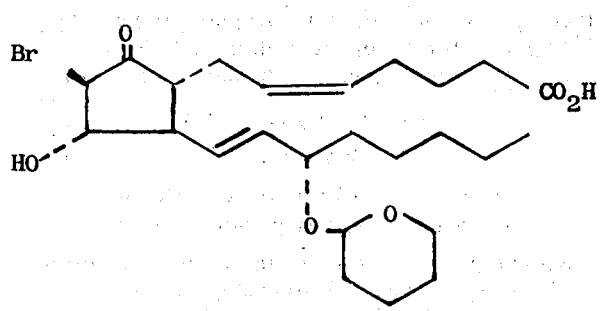

3. The compounds of claim 1 in which
X is a trans-double bond
Y is a cis-double bond
Z is a single bond.

* * * * *